United States Patent
Gu et al.

(10) Patent No.: US 7,486,063 B1
(45) Date of Patent: Feb. 3, 2009

(54) VERSATILE SYSTEM FOR HIGH-POWER SWITCHING CONTROLLER IN LOW-POWER SEMICONDUCTOR TECHNOLOGY

(75) Inventors: Wei Gu, Sunnyvale, CA (US); Christopher B. Richardson, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/903,737

(22) Filed: Sep. 24, 2007

Related U.S. Application Data

(63) Continuation of application No. 11/265,783, filed on Nov. 2, 2005, now Pat. No. 7,274,183.

(51) Int. Cl.
*G05F 1/40* (2006.01)
(52) U.S. Cl. ...................... 323/288; 323/284
(58) Field of Classification Search .............. 323/288, 323/284, 282
See application file for complete search history.

(56) References Cited

U.S. PATENT DOCUMENTS

| | | | |
|---|---|---|---|
| 5,548,206 | A | 8/1996 | Soo |
| 6,515,460 | B1 | 2/2003 | Farrenkopf |
| 6,603,673 | B2 * | 8/2003 | Yamamoto ................... 363/60 |
| 7,042,204 | B2 | 5/2006 | Wang |

OTHER PUBLICATIONS

Lloyd Dixon, "Average Current Mode Control of Switching Power Supplies", 2001, 16 pages.
W. Tang et al., "Small-Signal Modeling of Average Current-Mode Control", 1992 IEEE, pp. 747-755.
George C. Verghese et al., "Averaged and Sampled-Data Models for Current Mode Control: A Reexamination", 1989 IEEE, pp. 484-491.
Hao Peng et al., "Digital Current-Mode Controller for DC-DC Converters" 2005 IEEE, pp. 899-905.

* cited by examiner

*Primary Examiner*—Shawn Riley

(57) ABSTRACT

The present invention provides a versatile system for providing a current-mode switching controller—in low voltage commercial semiconductor technologies—that is compatible with applications having very high input voltage ranges. The system provides an output transistor and a sense element coupled to the output transistor. A waveform representative of current charging across the sense element is recognized. First and second charging elements are provided, and the second charging element is adapted to charge at a rate twice as fast as the first charging element. First and second switching elements, coupled to the first and second charging elements, respectively, are adapted to activate the first and second charging elements responsive to a rising edge of the waveform. An output charge element is provided, and a sample and hold construct is adapted to transfer a charge value—to the output charge element—that corresponds to an average of the charge values of the first and second charging elements upon a falling edge of the waveform.

20 Claims, 2 Drawing Sheets

VERSATILE SYSTEM FOR HIGH-POWER SWITCHING CONTROLLER IN LOW-POWER SEMICONDUCTOR TECHNOLOGY

This application is a continuation of prior U.S. patent application Ser. No. 11/265,783 filed on Nov. 2, 2005 now U.S. Pat. No. 7,274,183.

TECHNICAL FIELD OF THE INVENTION

The present invention relates generally to power regulation components and, more particularly, to a system for providing a high input voltage, current mode switching controller in a low power semiconductor process technology.

BACKGROUND OF THE INVENTION

A number of modern electrical systems utilize components having disparate structural or operational characteristics—such as differing power supplies or operational voltage levels. Many consumer products rely on battery power or some combination of battery and continuous power supplies. In many cases, various electrical components and devices within such products have operational parameters that are not directly compatible with power from a battery supply. Frequently, therefore, systems that utilize some form of battery power require conversion of the battery output to levels compatible with the operational characteristics of a system's constituent components.

Consider, for example, automotive electrical systems—which can have a wide range of relatively high operational voltage levels. Standard operating conditions in such applications can run from, for example, on the order of 10 V-40 V, and in some fault conditions, those voltage levels could reach as high as 100 V. In contrast, the operational voltage range most high-volume commercial integrated circuit technologies operate with voltage supplies in the range of about 1.8 V-5 V.

In a number of instances, therefore, devices designed for use in such high voltage applications can not be produced in the most cost-efficient production technologies. For semiconductor devices, more robust and much more expensive high-voltage process technologies may need to be utilized. Additionally, or alternatively, lower voltage components may be supplemented with costly discrete components to compensate for voltage differentials. In either case, these measures result in a more costly or complicated design.

In a number of applications, switching regulator devices are employed to address voltage level mismatches. Switching regulators are one approach to providing dc-dc power conversion. Generally speaking, a switching regulator may comprise some form of inverter circuit connected to a low-pass filter, composed of an inductor and a capacitor. The inverter circuit produces a voltage waveform having on-time during pulses and off-time between pulses. The low-pass filter smoothes the waveform, thereby producing a constant dc voltage level. During on-time, the capacitor charges, and it discharges during off-time. Voltage level is regulated by controlling the duration and frequency of voltage pulses produced (i.e., on-time versus the off-time).

The ratio of on-time versus the total time for both on-time and off-time is referred to as the duty cycle. By lowering duty cycle, voltage is lowered—since charge-up time for the capacitor is shortened and discharge time is lengthened. Increasing the duty cycle increases the voltage—since charge-up time is lengthened and discharge time is shortened.

Common forms of conventional switching regulators use transistors as switches in an inverter network. The switches are turned on and off by providing a current or a voltage to the transistors' gates. The frequency with which such a transistor is turned on and off is controlled by a pulse-width modulator (PWM). Commonly, conventional switching regulators monitor peak current across some "sense" circuitry (e.g., across a resistor), and adjust output voltage from the transistor accordingly.

While this approach may be sufficient for some applications, there are a number of applications that require a regulated output current in addition to or instead of regulated output voltage. Consider, for example, certain automotive LED components and drivers. A number of such devices either require or operate optimally at a constant current level—notwithstanding variations in voltage levels elsewhere in the electrical system. Conventional switching regulators commonly do not address such a need or requirement.

Depending upon the particular regulated current needs of a given application, conventional switching regulators might be supplemented with discrete components to provide needed current regulation in a high input power setting. In some cases, such supplementation may be unsuccessful, or marginally effective. Even where such supplementation may be successful, the additional components can represent a substantial cost increase to the system.

As a result, there is a need for a system that provides versatile switching regulators compatible with use in high power input applications—and capable of providing current mode switching regulation—in a cost-effective, commercially-viable manner.

SUMMARY OF THE INVENTION

The present invention provides a versatile system, comprising various constructs and methods, for providing current-mode switching controllers compatible with high voltage input applications. The present invention provides for the production of such controllers in a low power commercially economical semiconductor process technology.

Specifically, the present invention provides a switching regulator architecture that monitors current level of a system and provides a regulated average output current. An averaging construct determines the average current flowing through a power inductor of a switching regulator device and, via a sample-and-hold component, sets a corresponding output voltage proportional to the average current level.

More specifically, various embodiments of the present invention provide a versatile system for producing a current-mode switching controller—in low voltage commercial semiconductor technologies—that is compatible with applications having very high input voltage ranges. The system provides an output transistor and a sense element coupled to the output transistor. A waveform representative of current charging across the sense element is recognized. First and second charging elements are provided, and the second charging element is adapted to charge at a rate twice as fast as the first charging element. First and second switching elements, coupled to the first and second charging elements, respectively, are adapted to activate the first and second charging elements responsive to a rising edge of the waveform. An output charge element is provided, and a sample and hold construct is adapted to transfer a charge value—to the output charge element—that corresponds to an average of the charge values of the first and second charging elements upon a falling edge of the waveform.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

Figure 1:
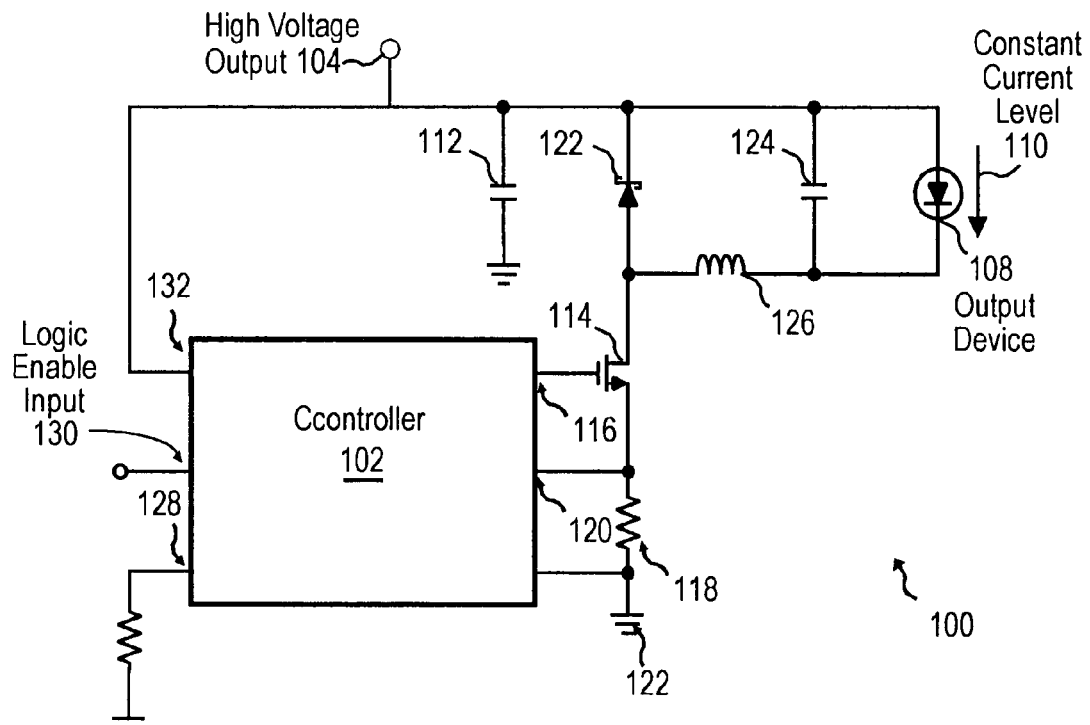
FIG. 1 provides an illustration depicting one embodiment of a driver circuitry segment illustrating certain aspects of the present invention.

While the making and using of various embodiments of the present invention are discussed in detail below, it should be appreciated that the present invention provides many applicable inventive concepts, which can be embodied in a wide variety of specific contexts. The present invention is hereafter illustratively described in conjunction with the design and operation of switching regulators, optimized for production in low power commercial semiconductor process technologies. Certain aspects of the present invention are further detailed in relation to the design and operation of a low side step-down switching controller device. Although described in relation to such constructs and schemes, the teachings and embodiments of the present invention may be beneficially implemented with a variety of semiconductor devices and technologies. The specific embodiments discussed herein are, therefore, merely demonstrative of specific ways to make and use the invention and do not limit the scope of the invention.

The present invention provides a versatile system, comprising various constructs and methods, for providing current-mode switching controllers compatible with high voltage input applications. These current-mode switching controllers have a stable average output current. The system of the present invention provides for the design of such controllers in a manner compatible with fabrication using low power, commercially economical semiconductor process technologies.

Specifically, the present invention provides a switching regulator architecture that monitors current level of a system and provides a regulated average output current. An averaging construct determines the average current flowing through a power inductor of a switching regulator device and, via a sample-and-hold component, sets a corresponding output voltage proportional to the average current level.

As previously presented, there are a number of applications in which some form of switching regulator device is required or desired. For purposes of explanation and illustration, certain aspects of the present invention are hereafter described in relation to one such application—an automotive electronics system. Typically in such applications, a switching regulator device must be capable of receiving relatively high input voltages—on the order of 100 volts in some fault conditions.

Under conventional approaches, switching converter topologies for such applications typically employ some form of high-side or floating MOSFET driver architecture. With such an approach, the switching converter device must be fabricated using a semiconductor process technology capable of supporting high input voltage levels. Unfortunately, such high voltage process technologies are not cheap and, as a result, conventional devices using such topologies are often relatively expensive.

The present invention recognizes that it would be highly advantageous to provide a switching converter device, capable of supporting high input voltage levels, that was produced in a low cost, high volume commercial semiconductor process. Most such processes, however, are also relatively low voltage technologies, having operational voltage ranges from about 1.8 volts to 5 volts. Utilizing conventional topologies, switching converters produced from such technologies, and having input voltage ranges of 10-50 volts, would not be feasible.

It may be possible to utilize a low-side driver architecture device—produced in a low voltage technology—in combination with some additional componentry (e.g., discrete transistors, resistors, diodes) or integrated circuitry, to protect the input of the low voltage device. For example, input to low voltage circuitry may be provided with sufficient high voltage by use of a Zener diode and a resistor at the input, or by the use of a high voltage discrete MOSFET. Due to the configuration of such devices, however, there are certain drawbacks to such approaches.

Conventionally, designs utilizing such devices are configured such that the device outputs are referenced to ground (i.e., rely on a sense resistor coupled to ground). There are a number of high power device driver applications (e.g., industrial, automotive) that require constant output current to a device. In such applications where the output is not referenced to ground, but instead is referenced to the input voltage, a significant volume of additional, robust discrete componentry (e.g., transistors, op-amps) would be required to supplement conventional switching regulator devices for such performance—especially where input voltage ranges are relatively high. Discrete high voltage components are typically very costly, and such measures would not render a commercially viable solution.

Ideally, it would be desirable to implement a low side driver architecture for use in such high input voltage applications—one that utilizes a low cost switching regulator device and a minimum of low-cost componentry. For purposes of illustration and explanation, FIG. 1 depicts a driver circuitry segment 100 in accordance with the present invention that implements such a topology. Segment 100 comprises a current mode switching controller 102 according to the present invention, implemented for operation in relation to a high voltage input 104—which may range, for example, from about 5 volts to about 40 volts. Segment 100 drives an output segment 106 comprising an output device 108 (e.g., an LED) requiring a constant current level 110.

Segment 100 further comprises an input capacitor 112 coupled between input 104 and ground. An NMOS transistor 114 drives segment 106. The gate of transistor 114 is coupled to the NGATE output 116 of controller 102. A sense resistor 118 is coupled between the drain of transistor 114 and ground, and a sense current input 120 of controller 102 is also coupled to the drain of transistor 114. A Zener diode 122 is coupled between input 104 and the source of transistor 114. The loading effect of segment 106 is represented here by output capacitor 124, which is coupled in parallel to diode 122, and inductor 126, which is coupled between capacitor 124 and the source of transistor 114.

Transistor 114 serves as an external N-MOSFET switch for a step-down (Buck) regulator configuration of segment 100. Resistor 118 may comprise any suitable resistor, having a desired tolerance, that enables converter output voltage to adjust as needed to deliver constant current 110, with a desired accuracy, to series connected output segment 106 (e.g., an LED string 108 of varying number and type). Switching frequency is controlled by input 128 to controller 102, is adjustable over a broad range and includes a small variation to minimize narrow-band EMI/EMC emissions. A logic enable input 130 of controller 102 may be provided by a PWM input from segment 106 or some other external source. A voltage input 132 of controller 102 is coupled to input 104.

Figure 2:
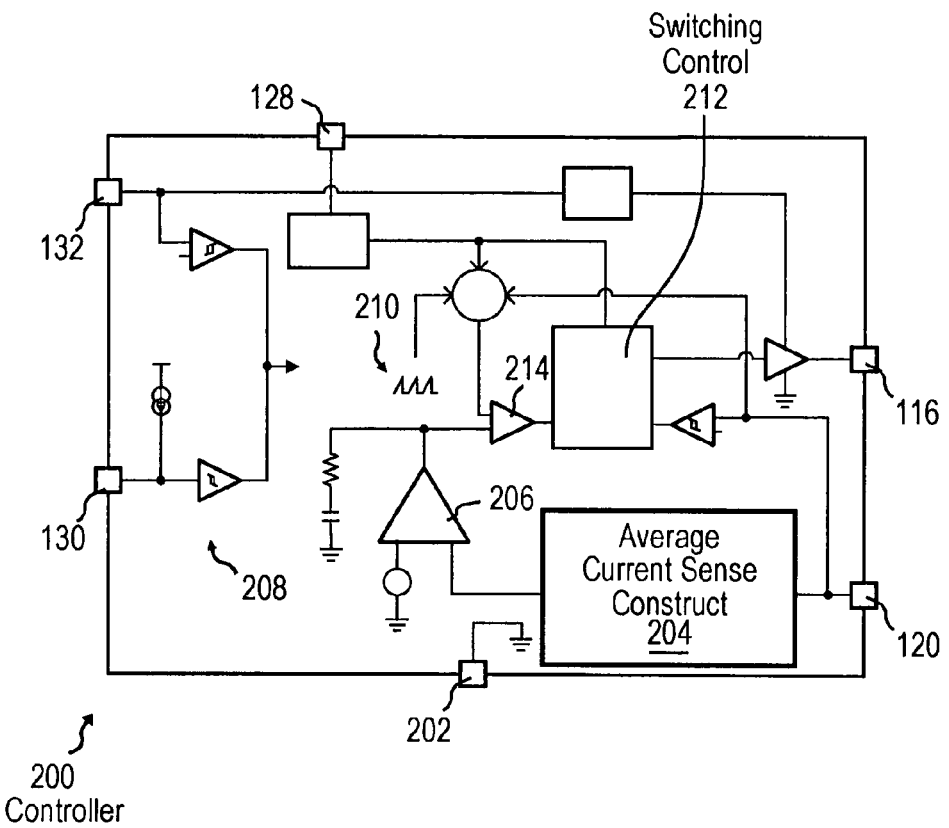
FIG. 2 provides an illustration depicting one embodiment of a current mode switching controller illustrating certain aspects of the present invention.

Referring now to FIG. 2, one embodiment of a current mode switching controller 200 of the type described above is depicted. Controller 200 comprises input/output connections 116, 120, 128, 130 and 132 from FIG. 1, as well as a ground connection 202. Controller 200 comprises an average current sense construct 204 intercoupled between an error gain amplifier 206 and sense input 120.

Operationally, enable circuitry 208 is driven by input 130 to activate operation of controller 200. Current flows, peaks and drops through the low side connected resistor, in a manner represented by an equivalent triangular or trapezoidal waveform 210. A switching control component 212 controls the on/off switching responsive to frequency select input 128. Current sense construct 204 receives peak current values from sense input 120, and outputs to error gain amplifier 206 a midpoint value on waveform 210—the average current value. Given this value, amplifier 206 may then be properly calibrated to drive PWM comparator 214 which, in turn, drives a reset input of component 212. As a result, the gate voltage of a transistor coupled to output 116 is driven in a manner that drives its output voltage to a level proportional to the average current through the sense resistor.

Figure 3:
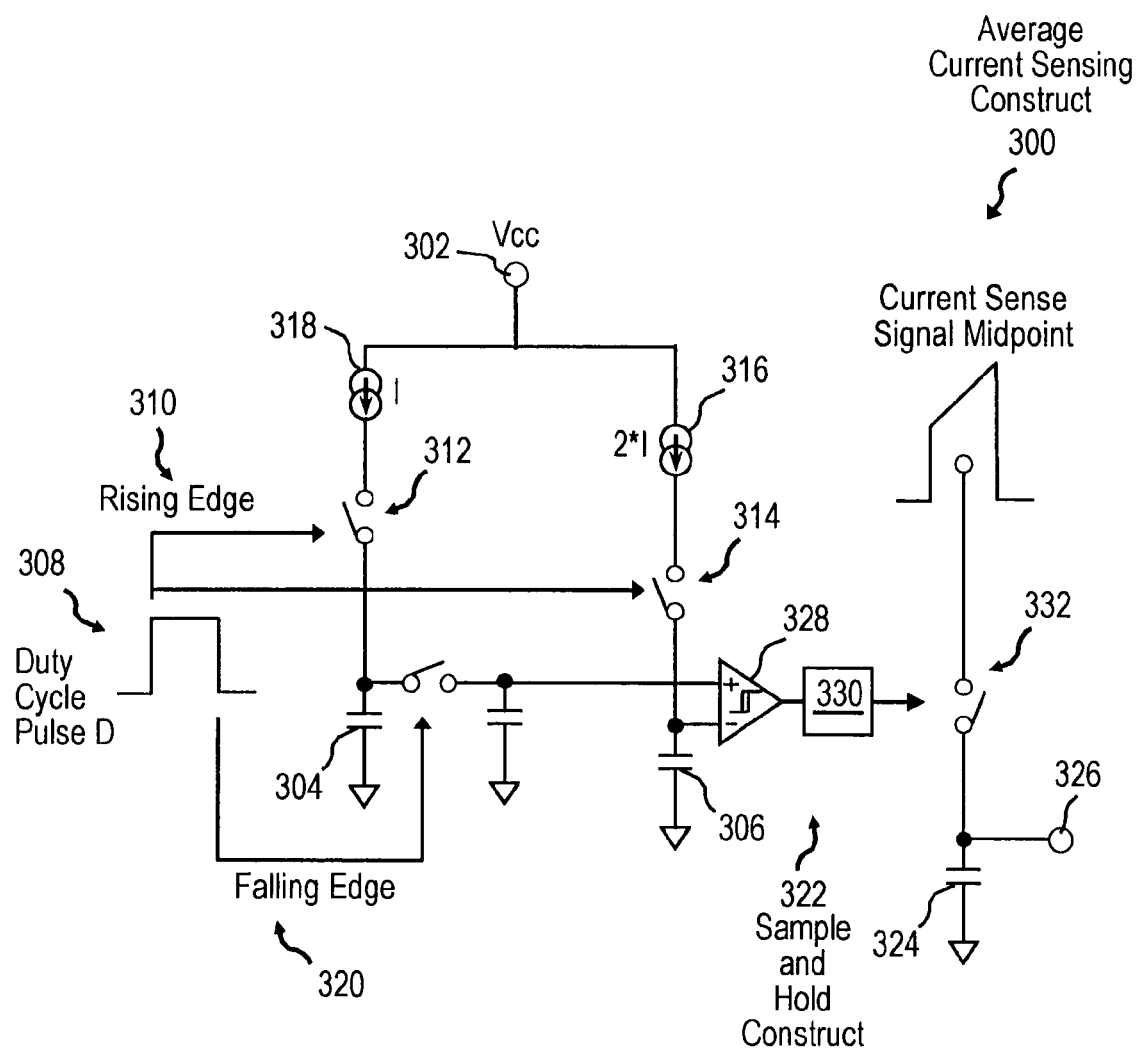
FIG. 3 provides an illustration depicting one embodiment of an average current sense construct illustrating certain aspects of the present invention.

Referring now to FIG. 3, one embodiment of an average current sensing construct 300 in accordance with the present invention is depicted in greater detail. Construct 300 comprises a voltage supply 302, and first and second charging elements 304 and 306, respectively. In the embodiment depicted, elements 304 and 306 comprise capacitors. Construct 300 is driven by waveform pulse 308 (D). The rising edge 310 of pulse 310 is recognized and activates switching elements 312 and 314 corresponding to elements 304 and 306, respectively. Charging element 306 begins charging at a current value 316 and rate that is twice the current value 318 and rate of element 304. A falling edge 320 of pulse 308 is recognized and disables or resets the charging, and a sample and hold construct 322 transfers an average of the values on capacitors 304 and 306—which represents the voltage value at the midpoint of pulse 308—to an output charge element 324 (e.g., a capacitor). That voltage value is held at element 324, and coupled via output 326 to the error gain amplifier previously described, until the next pulse rising edge occurs.

Sample and hold construct 322 may be implemented in a variety of ways compatible with the present invention. As depicted in FIG. 3, construct 322 comprises an averaging or comparator component 328. The comparator 328 flips at the midpoint voltage value, and sends a one-shot signal to a switch 332 that couples to and activates capacitor 324. Switch 332 and capacitor 324 form a sample and hold circuit that stores the current sense signal voltage at its midpoint, which represents the average of the current sense signal voltage. Referring back to FIG. 2, having now a voltage value corresponding to average current through the resistor, component 200 adapts the pulse width modulation of a corresponding output transistor, which controls the average current through the corresponding output segment (i.e., load).

The system of the present invention thus provides a true current mode switching controller design that is readily adaptable to a variety of applications. Given the constituent constructs and operational modes, the architecture of the present invention may be implemented in a low cost, low voltage semiconductor process. Using nominal discrete supplementation, the system of the present invention may nonetheless be scaled to accommodate very high input voltage ranges safely.

In all embodiments of the present invention, the constituent constructs, operations, functions or components may be implemented in a wide variety of ways—comprising various suitable circuitry or discrete components, or combinations of thereof. Certain functions or operations may be provided in exclusively in discreet circuitry or as separate or integrated semiconductor devices. Operational voltage or current levels may be tailored to suit the needs of a particular application. All such variations, and all other similar variations and combinations, are comprehended by the present invention. All such embodiments may be employed to provide the benefits of the present invention.

The embodiments and examples set forth herein are therefore presented to best explain the present invention and enable those skilled in the art to make and utilize the invention. However, those skilled in the art will recognize that the foregoing description and examples have been presented for the purpose of illustration and example only. The teachings and principles of the present invention are applicable to a number of semiconductor device applications. The description as set forth herein is therefore not intended to be exhaustive or to limit the invention to the precise form disclosed. As stated throughout, many modifications and variations are possible in light of the above teaching without departing from the spirit and scope of the following claims.

What is claimed is:

1. A switching regulator device comprising:
   an output transistor;
   a sense element coupled to the output transistor;
   first and second charging elements adapted to activate responsive to a charge building on the sense element, wherein the second charging element is adapted to charge at a faster rate than the first charging element;
   an output charge element; and
   a sample and hold construct adapted to transfer a charge value to the output charge element, the charge value based on charge values of the first and second charging elements.

2. The switching regulator device of claim 1, wherein the second charging element is adapted to charge twice as fast as the first charging element.

3. The switching regulator device of claim 1, wherein an output voltage of the output transistor is driven to a level proportional to an average current across the sense element.

4. The switching regulator device of claim 1, wherein the charge value transferred to the output charge element is based on an average of the charge values of the first and second charging elements.

5. The switching regulator device of claim 1, wherein the switching regulator device is fabricated in a low voltage semiconductor process technology having an operating voltage range of 5 volts or less.

6. The switching regulator device of claim 1, wherein the switching regulator device is adapted for operation in relation to a high voltage input having a range from 5 volts to 40 volts.

7. The switching regulator device of claim 1, wherein the output transistor comprises an NMOS transistor.

8. The switching regulator device of claim 1, wherein:
the sense element comprises a resistor coupled between the output transistor and ground;
the first and second charging elements comprise capacitors; and
the output charge element comprises a capacitor.

9. The switching regulator device of claim 1, wherein the sample and hold construct comprises a switch and a capacitor.

10. A method comprising:
sensing a current charging across a sense element coupled to a driver output transistor;
charging first and second charging elements in response to the current charging across the sense element, wherein the second charging element is charged at a faster rate than the first charging element; and
transferring a charge value to an output charge element, the charge value based on charge values of the first and second charging elements.

11. The method of claim 10, wherein:
sensing the current charging across the sense element comprises recognizing a waveform representative of the current charging across the sense element;
charging the first and second charging elements comprises charging the first and second charging elements responsive to a rising edge of the waveform; and
transferring the charge value to the output charge element comprises transferring the charge value to the output charge element responsive to a falling edge of the waveform.

12. The method of claim 10, further comprising:
controlling the driver output transistor responsive to the charge value transferred to the output charge element.

13. The method of claim 12, wherein controlling the driver output transistor comprises controlling pulse width modulation of the driver output transistor to maintain a desired average current value.

14. The method of claim 10, wherein the second charging element is adapted to charge twice as fast as the first charging element.

15. The method of claim 10, wherein the method is implemented using a low voltage semiconductor process technology having an operating voltage range of 5 volts or less.

16. The method of claim 10, wherein the method is adapted for operation in relation to a high voltage input having a range from 5 volts to 40 volts.

17. The method of claim 10, wherein:
the driver output transistor comprises a low power NMOS driver output transistor; and
the first and second charging elements comprise first and second capacitors.

18. The method of claim 10, wherein the driver output transistor comprises a driver output transistor in a high voltage LED driver.

19. A system comprising:
an output transistor;
a sense element coupled to the output transistor;
first and second charging elements, wherein the first and second charging elements are charged responsive to a rising edge of a waveform representative of a current charging across the sense element, wherein the second charging element is adapted to charge at a faster rate than the first charging element;
an output charge element; and
a sample and hold construct adapted to transfer a charge value to the output charge element responsive to a falling edge of the waveform, the charge value based on charge values of the first and second charging elements.

20. The system of claim 19, wherein the charge value transferred to the output charge element is held at the output charge element until a next rising edge of the waveform.

\* \* \* \* \*